United States Patent [19]
Chang

[11] Patent Number: 5,933,628
[45] Date of Patent: Aug. 3, 1999

[54] METHOD FOR IDENTIFYING HARD-TO-PREDICT BRANCHES TO ENHANCE PROCESSOR PERFORMANCE

[75] Inventor: Po-Hua Chang, Saratoga, Calif.

[73] Assignee: Idea Corporation, Santa Clara, Calif.

[21] Appl. No.: 08/969,703

[22] Filed: Nov. 28, 1997

Related U.S. Application Data

[63] Continuation of application No. 08/699,827, Aug. 20, 1996, abandoned.

[51] Int. Cl.$^6$ .................................................. G06F 9/00
[52] U.S. Cl. ......................... 395/580; 395/581; 395/586
[58] Field of Search ............................ 395/580, 581–586

[56] References Cited

U.S. PATENT DOCUMENTS

| | | | |
|---|---|---|---|
| 4,287,559 | 9/1981 | Easley et al. | 395/581 |
| 4,399,505 | 8/1983 | Druke et al. | 395/596 |
| 4,742,453 | 5/1988 | Shibuya | 395/589 |
| 4,777,587 | 10/1988 | Case et al. | 395/582 |
| 5,093,778 | 3/1992 | Favor et al. | 395/587 |
| 5,142,634 | 8/1992 | Fite et al. | 395/587 |
| 5,212,794 | 5/1993 | Pettis et al. | 395/709 |
| 5,353,421 | 10/1994 | Emma et al. | 395/587 |
| 5,381,533 | 1/1995 | Peleg et al. | 395/391 |
| 5,394,529 | 2/1995 | Brown, III et al. | 395/587 |
| 5,414,822 | 5/1995 | Saito et al. | 395/587 |
| 5,553,253 | 9/1996 | Pan et al. | 395/587 |
| 5,564,118 | 10/1996 | Steely et al. | 395/587 |
| 5,596,732 | 1/1997 | Hosoi | 395/709 |
| 5,649,203 | 7/1997 | Sites | 395/709 |
| 5,655,122 | 8/1997 | Wu | 395/705 |

OTHER PUBLICATIONS

Complier–Driven Hybrid Dynamic Branch Predictor, IBM Technical Disclosure Bulletin, vol. 36 No. 2, Feb. 1993, pp. 127–130.

Polymorphic Branch Predictor, IBM Technical Disclosure Bulletin, vol. 37 No. 07 Jul. 1994, pp. 109–113.

Alternative Implementations of Two–Level Adaptive Branch Prediction, Tse–Yu Yeh and Yale N. Patt, The 19th Annual International Symposium on Computer Architecture, May 19–21, 1992, pp. 124–134.

Branch Prediction Strategies and Branch Target Buffer Design, Johnny K.F. Lee, Computer, Jan. 1984, vol. 17 No. 1 (ISSN 0018–9162), pp. 6–22.

Two–Level Adaptive Training Branch Prediction, Tse–Yu Yeh and Yale N. Patt, Department of Electrical Engineering and Computer Science, The University of Michigan, Ann Arbor, Michigan, pp. 51–61.

A Comparison of Dynamic Branch Predictors that use Two Levels of Branch History, Tse–Yu Yeh and Yale N. Patt, The 20th Annual International Symposium on Computer Architecture, May 16–19, 1993 pp. 257–266, cover and table of contents.

(List continued on next page.)

*Primary Examiner*—Zarni Maung
*Attorney, Agent, or Firm*—Blakely, Sokoloff, Taylor & Zafman, LLP

[57] ABSTRACT

A method and apparatus for handling branch instructions contained within a source program includes applying a set of heuristics to classify each of the branch instructions in the source program as either a hard-to-predict type or a simple type of branch. A system implements a multi-heuristic branch predictor comprising a large, relatively simple branch predictor having many entries, to accommodate the majority of branch instructions encountered in a program, and a second, relatively small, sophisticated branch predictor having a few entries. The sophisticated branch predictor predicts the target addresses of the hard-to-predict branches. By mapping hard-to-predict branches to the sophisticated branch predictor, and easy-to-predict branches to the relatively simple branch predictor, overall performance is enhanced.

15 Claims, 3 Drawing Sheets

OTHER PUBLICATIONS

Branch Classification: a New Mechanism for Improving Branch Predictor Performances, Po–Yung Chang, et al., Department of Electrical Engineering and Computer Science, The University of Michigan, Ann Arbor, Michigan, Intel Corporation, pp. 22–31.

Improving the Accuracy of Dynamic Branch Prediction Using Branch Correlation, Shien–Tai Pan, Kimming So, Joseph T, Rahmeh, pp. 76–84.

A Study of Branch predication Strategies, James E. Smith, Control Data Corporation, Arden Hills, Minnesota, pp. 135–148.

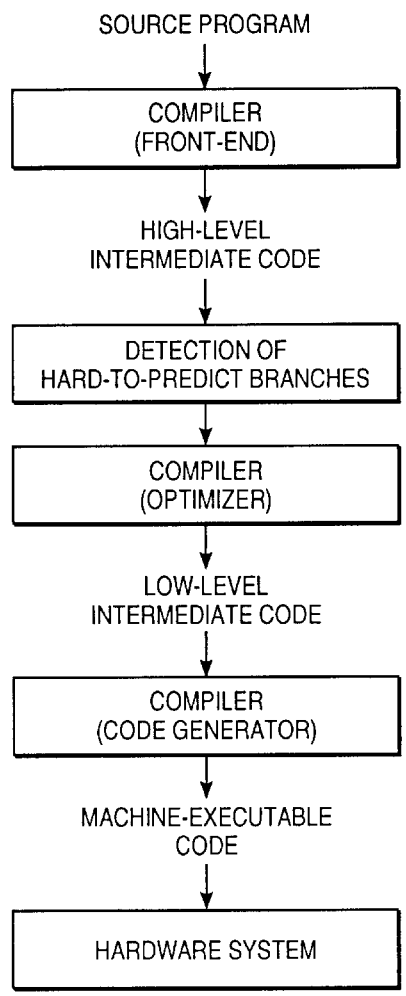
FIG_1
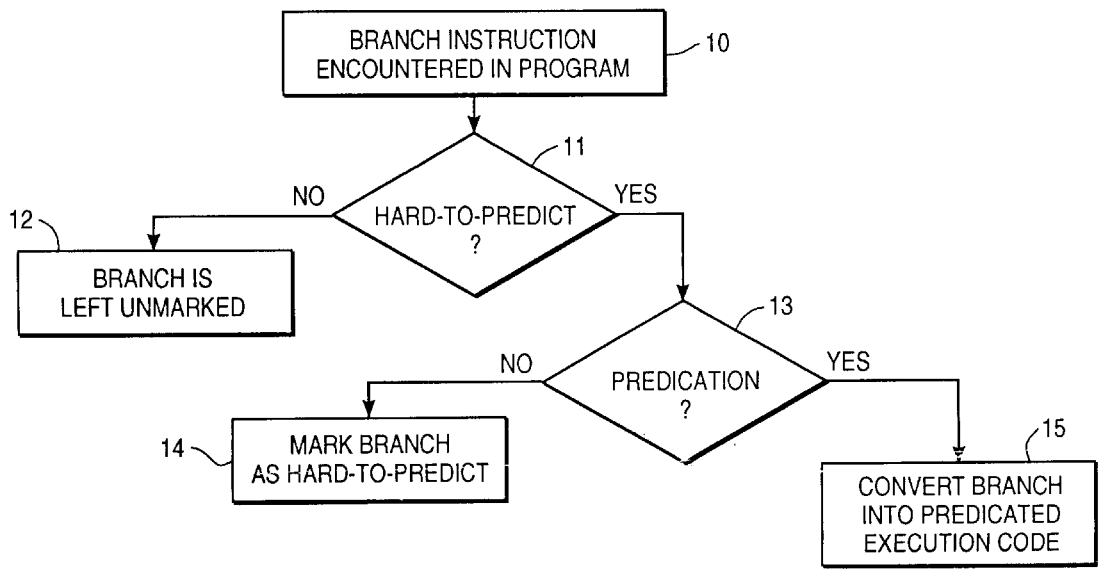
FIG_2

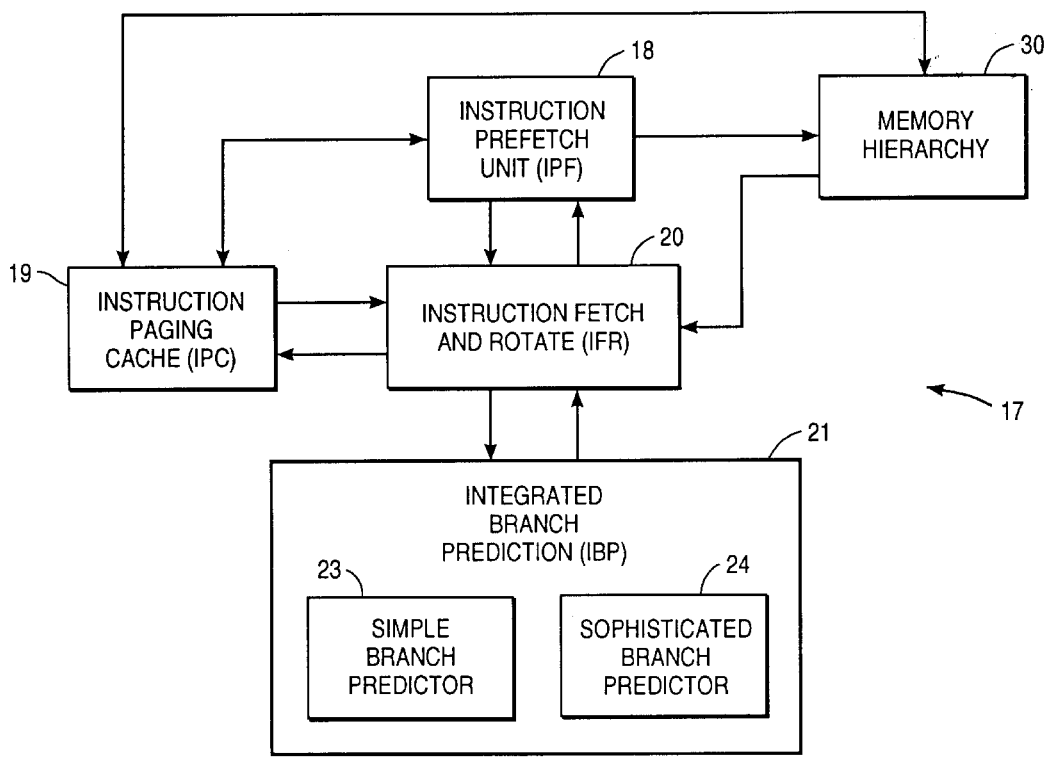
FIG_3
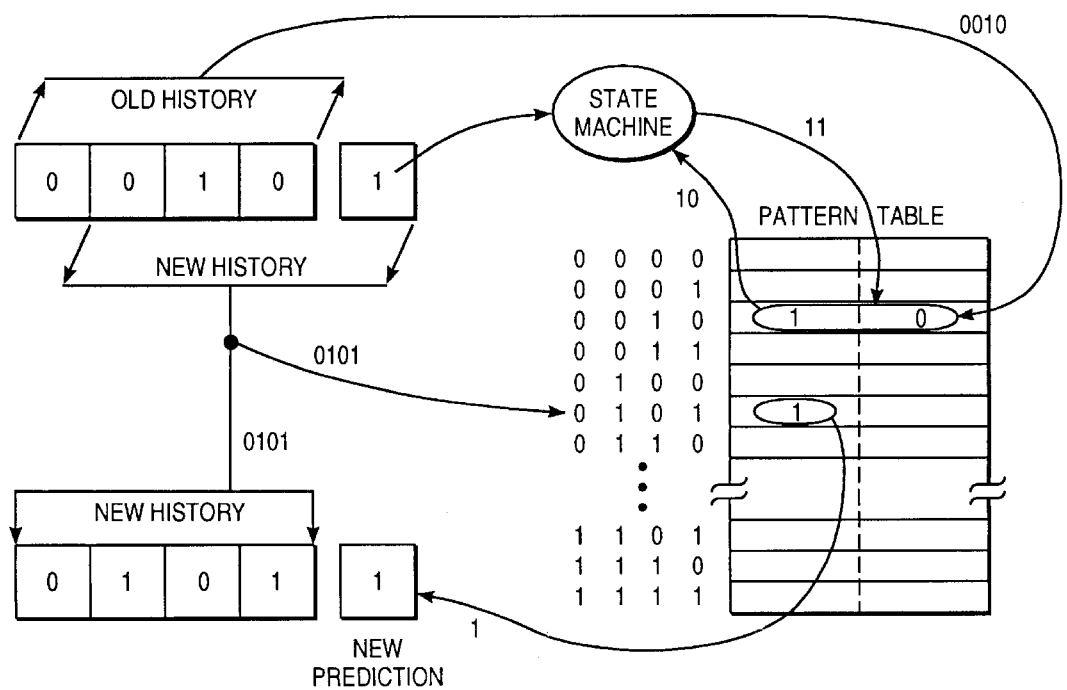
FIG_4

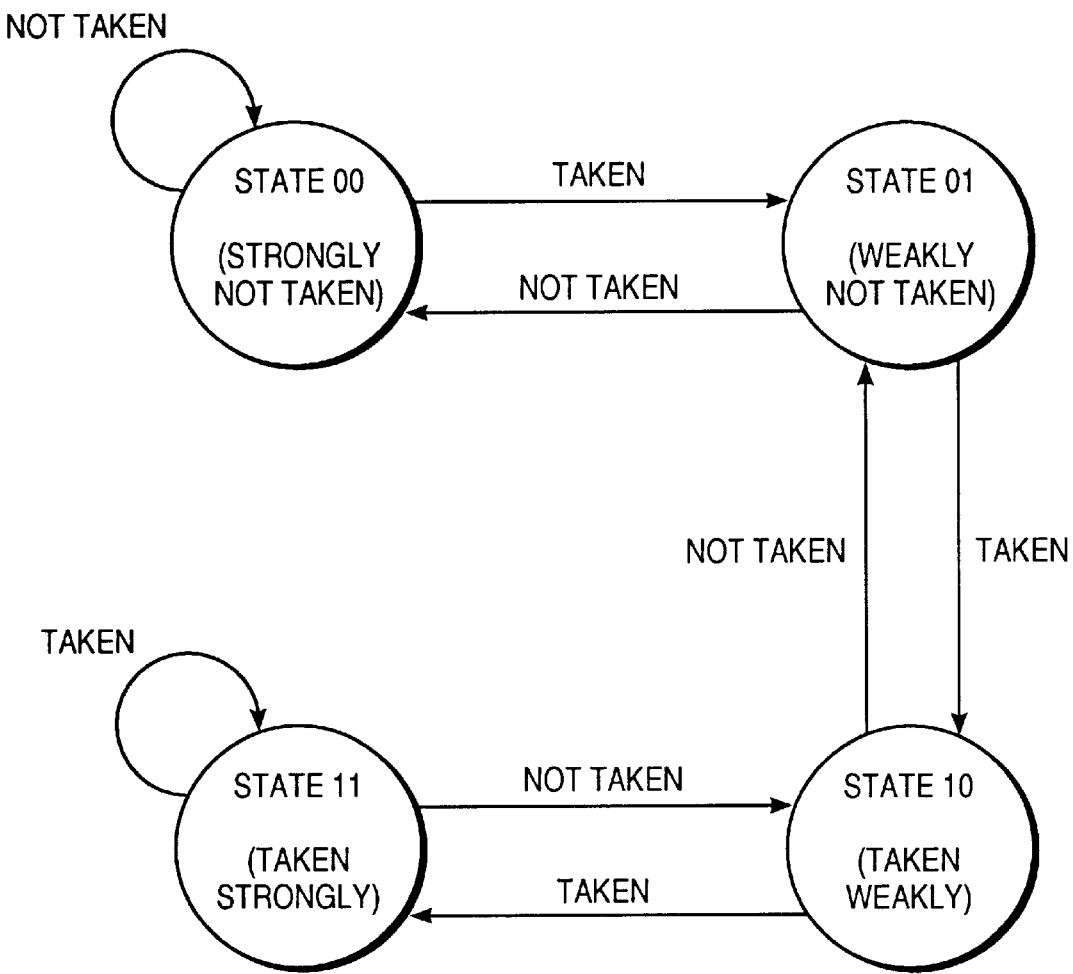
FIG_5

METHOD FOR IDENTIFYING HARD-TO-PREDICT BRANCHES TO ENHANCE PROCESSOR PERFORMANCE

This is a continuation of application Ser. No. 08/699,827, filed Aug. 20, 1996, now abandoned.

FIELD OF THE INVENTION

The present invention relates generally to the field of branch prediction in microprocessors.

BACKGROUND OF THE INVENTION

Pipelining is a well-known technique whereby several instructions are overlapped in execution. Today, most microprocessors rely upon pipelining for improved, high-speed performance. A major effect of pipelining, however, is that it introduces data and control hazards, which can cause significant performance losses. For example, the ideal speedup from pipelining can be reduced by half due to pipeline stalls and other delays caused by branch penalties.

Branch instructions can be either unconditional, meaning that the branch is taken every time that the instruction is encountered in the program, or conditional, meaning that the branch is either taken or not taken, depending upon a condition. Most often, the instructions to be executed following a conditional branch are not known with certainty until the condition upon which the branch depends has been resolved. These types of branches can significantly reduce the performance of a pipeline processor since they may interrupt the steady supply of instructions to the execution hardware. Branch predictors attempt to predict the outcome of conditional branch instructions in a program before the branch instruction is executed. If a branch is mispredicted, all of the speculative work, beyond the point in the program where the branch is encountered, must be discarded. Therefore, a highly-accurate branch prediction mechanism is vital to a high-performance, pipelined processor.

The prior art is replete with different branch prediction schemes. A general overview of the problems associated with branch prediction, and the presentation of a number of solutions is provided in an article by J. Lee and A. J. Smith, "Branch Prediction Strategies and Branch Target Buffer Design", *IEEE Computer* (January 1984). An article authored by James E. Smith, entitled "A Study of Branch Prediction Strategies", *IEEE* (1981) discusses a variety of branch prediction techniques in terms of accuracy, costs and flexibility of use. A typical method of branch prediction utilizes a memory to store branch history information associated with the branch instruction. An example of this approach to branch prediction is found in U.S. Pat. No. 5,142,634.

Many early implementations of branch predictors used simple history bits and counter-based schemes that provide branch prediction accuracy of about 85–90%. Attempts to improve upon the accuracy of simple 2-bit counter schemes have included predictors that relate the sub-history information of a branch to the most recently executed branches via a shift register. An example of this approach is disclosed in the article entitled "Improving the Accuracy of Dynamic Branch Prediction Using Branch Correlation", by Shien-Tai Pan, et al.

As the complexity of the branch prediction problem increases, so has the sophistication of branch predictors. By way of example, the article "Branch Classification: A New Mechanism for Branch Predictor Performance", by Po-Young Chang, et al., *Proceedings from Micro*-27 (December 1994) describes a hybrid predictor in which each component branch predictor predicts only those branches for which it is best suited. Other sophisticated approaches employ complicated branch prediction algorithms that try to predict whether or not a branch will be taken based upon a lot of history information. This category of branch predictions is exemplified by mechanisms disclosed in several papers by Tse-Yu Yeh and Yale N. Patt entitled, "A Comparison of Dynamic Branch Predictors that Use Two Levels of Branch History" *IEEE* (1993); "Two-Level Adaptive Training Branch Prediction"; and "Alternative Implementations of Two-Level Adaptive Branch Prediction" *ACM* (1992).

One of the problems with sophisticated branch predictors is the large amount of the silicon space required for implementing the branch prediction hardware. This has presented microprocessor designers with a dilemma: either utilize a simple branch predictor (with limited accuracy) that occupies a small amount of area, or employ a sophisticated branch predictor (with higher accuracy) that takes up a relatively large amount of silicon space.

Thus, there exists an unsatisfied need for a way to optimize branch prediction.

SUMMARY OF THE INVENTION

The present invention improves the performance of computer systems which execute programs that include branch instructions. Because branch miss penalty is typically very large—especially for deeply pipelined, out-of-order execution processors—the invention advantageously identifies hard-to-predict branches and provides hardware optimization.

In one embodiment, the present invention comprises a method for handling branch instructions contained within a source program. The source program is processed by a compiler to produce a machine-executable code suitable for running on a hardware system. A compile-time semantic analysis of the source program identifies hard-to-predict branches. The analysis is performed by applying a set of heuristics to classify each of the branch instructions in the source program as either a hard-to-predict type or a simple type of branch. The heuristics clearly differentiate between easy-to-predict (i.e., simple) and hard-to-predict branches so that the hardware can be optimized to achieve the goals of implementing branch prediction algorithms with minimum silicon space, while simultaneously achieving a high prediction accuracy.

BRIEF DESCRIPTION OF THE DRAWINGS

The novel features which are characteristic of the present invention are set forth in the appended claims. The invention itself, however, as well as other features and advantages, is best understood with reference to the detailed description which follows, read in conjunction with the accompanying drawings, and wherein:

FIG. 1 is compilation process flow chart in accordance with one embodiment of the present invention.

FIG. 2 illustrates the use of predication in accordance with one embodiment of the present invention.

FIG. 3 illustrates the functional blocks of a front-end unit in accordance with an embodiment of the present invention.

FIG. 4 shows a two-level adaptive prediction algorithm utilized in one embodiment of the present invention.

FIG. 5 illustrates a branch prediction state machine.

DETAILED DESCRIPTION

The trend in microprocessor design is to employ increasingly sophisticated hardware branch predictors. But as the sophistication of the branch prediction hardware increases, so does the silicon space required to implement such prediction algorithms. Moreover, sophisticated branch predictors rely upon an abundance of history information to make accurate predictions. This means that a large enough history (i.e., until enough number of branches have been executed) must be accumulated in order to make an accurate prediction. For large programs, such as operating systems and database programs, sophisticated branch predictors may actually perform worse than simple 2-bit counter schemes, due to high branch predictor miss ratios and the high cost of initializing the branch history.

The present invention solves these problems by providing a system that implements a multi-heuristic branch prediction mechanism. The multi-heuristic branch predictor comprises a large, relatively simple branch predictor having many entries to accommodate the majority of branch instructions encountered in a program. There is also included a second, relatively small, sophisticated branch predictor having a few entries. The sophisticated branch predictor is utilized to predict the target addresses of a few branch instructions that are classified as hard-to-predict branches. The combined size of the large, simple branch predictor and the small, sophisticated branch predictor is much smaller than the large, sophisticated branch predictors commonly employed in today's computer systems.

By mapping hard-to-predict branches to the sophisticated branch predictor, and easy-to-predict branches to the relatively simple branch predictor, overall performance is better than it a large, sophisticated branch predictor is used to predict all of the branches in a program.

For large computer programs, the present invention advantageously reduces the number of branch prediction misses in the sophisticated branch predictor. This is accomplished through a compile-time semantic analysis of the source program that identifies hard-to-predict branches by applying a set of heuristics. In one embodiment of the present invention, this procedure is performed statically at compile time.

FIG. 1 is a computation process flow chart for one embodiment of the present invention. As shown, the compiler (front-end) processes the source program and produces a high-level intermediate code therefrom. This high-level intermediate code is in a form that is more easily processed by the compiler optimizer at a subsequent stage. As will be appreciated by practitioners familiar with compilers and computer systems, the high-intermediate code contains full semantic information.

The next step in the process flow chart involves use of an algorithm to detect the hard-to-predict branches. This algorithm is run immediately after the compiler front-end phase has completed. The detection of the hard-to-predict branch instructions is performed by applying a set of heuristics at compile time to the high-level intermediate code.

In one embodiment, a branch is classified as a hard-to-predict type of branch if it is:

1. A conditional expression that involves an array element access (i.e., a[i]) or a pointer reference (i.e., *p); or 2. A loop that traverses a linked data structure (i.e., linked list); or 3. A loop that iterates a fixed number of iterations (e.g., >8).

It should be understood that the above-listed heuristics are the result of profiling important branches in SPEC95 CINT benchmark programs listed below in Table I. This analysis compared actual branch direction with simulated prediction, with the performance of the branch predictor being determined on a per-branch basis.

TABLE I

| BENCHMARK | INPUT |
| --- | --- |
| 099.go | 2stone19.in |
| 124.m88ksim | dcrand |
| 126.gcc | stmt.i |
| 129.compress | bigtest.in |
| 130.li | train.lsp |
| 132.ijpeg | original_image.pm |
| 134.perl | primes.pl |
| 147.vortex | input.train/vortex.in |

Branches accounting for the largest number of branch miss predictions have common characteristics that produce the above-listed set of heuristics. It is appreciated that other embodiments may apply a different set of heuristics. In still other implementations, a subset of the above-listed heuristics may be utilized.

Referring now to FIG. 3 there is shown a front-end cluster 17 of a microprocessor utilized in one embodiment of the present invention. Front-end cluster 17 is responsible for fetching and presenting instructions to the expand and dispersal network which includes the execution units of the processor. The main units of cluster 17 include an instruction fetch and rotate unit (IFR) 20, instruction prefetch unit (IPF) 18, instruction paging cache unit (IPC) 19, and an integrated branch prediction (IBP) unit 21. IBP unit 21 comprises simple branch predictor 23 and sophisticated branch predictor 24 for handling easy and hard to predict branches, respectively. Memory hierarchy 30, which may include various levels of cache memory, is shown in FIG. 3 coupled to units 18–20.

The instruction prefetch unit 18 is responsible for prefetching instruction bundles from memory hierarchy 30 to feed the instruction pipeline. IFR unit 20 rotates and aligns instructions fetched from the hierarchy before presenting then to the expand and dispersal network of the microprocessor. IPC unit 19 performs the virtual-to-physical address translation of fetch addresses from IFR 20 and of prefetch addresses from IPF 18. Integrated branch prediction unit 21 dynamically predicts branches early in the instruction pipeline. BPT 21 makes a prediction on branches as they occur in the fetched cache line. If the prediction is "not taken" and more branches remain in the fetched cache line, then the BPT 21 remains on that cache line in the following cycles until no more branches remain, or branches are predicted "taken".

Instructions that have been classified as easy-to-predict are steered to simple branch predictor 23. Simple branch predictor 23 may comprise, for example, an ordinary 2-bit counter, or other well-known simple branch predictor circuits. An example of a saturating 2-bit up/down counter implementation of a prediction state machine is illustrated in FIG. 5. A truth table for the state machine of FIG. 5 is shown below in Table II.

TABLE II

| OLD STATE | BRANCH PREDICTION | NEW STATE |
| --- | --- | --- |
| 00 | 0 | 00 |
| 01 | 0 | 00 |

TABLE II-continued

| OLD STATE | BRANCH PREDICTION | NEW STATE |
|---|---|---|
| 10 | 0 | 01 |
| 11 | 0 | 10 |
| 00 | 1 | 01 |
| 01 | 1 | 10 |
| 10 | 1 | 11 |
| 11 | 1 | 11 |

It is appreciated that the state machine counter illustrated in FIG. 5 is incremented when a branch is taken until the counter saturates at state 11. The counter is decremented when a branch is not taken until the counter saturates at 00. Prediction is represented by the most significant bit of the state.

The sophisticated branch predictor unit 24 shown in FIG. 3 may comprise any of a variety of branch predictor circuits such as that shown in FIG. 4. FIG. 4 illustrates a two-level adaptive branch predication algorithm that may consist of a set-associative cache, where each entry keeps a first-level history of a branch, and branch prediction logic. Each entry of predictor 24 keeps a 4-bit branch history. Each set of predictor 24 has a 16-entry pattern history table indexed by the branch history. Each pattern history table entry represents the branch prediction state based on a 2-bit, up/down, saturating counter, such as that shown in FIG. 5. When predictions have started on an entry, a speculative copy of a 4-bit branch history is kept and used.

As shown in FIG. 4, there are two processes that occur in parallel. First, the new history is used to access the pattern history table in order to generate a new prediction bit. The prediction is written into the pattern table for the next branch prediction. Second, the old history is used to access the pattern history table in order to generate the state that needs to be updated. The updated state is then written back into the pattern history table.

In the example of FIG. 4, the history of the entry to be updated is indicated as 0010, and the branch prediction is taken. The new history is 0101 and is used to index the pattern history table. The new prediction for the branch is obtained from the most significant bit, in this case 1, meaning predicted taken. The old history, 0010, is used to index the pattern history table to get the old state, 10. This old state, 10, is sent to the state machine along with the branch decision, and the new state, 11, is written back into the pattern history table. As previously explained, a 2-bit saturating, up/down counter may be used to update the states stored in the pattern history table.

Although the present invention contemplates utilizing a hint bit to classify a branch instruction as a hard-to-predict type of branch instruction, an alternative is to generate predicate execution code in place of some or all hard-to-predict branches. The predicated execution is the conditional execution of an instruction under the control of a predicate. By conditionally executing all instructions in a piece of code under guard of a condition (instead of requiring change of control flow), predication effectively eliminates branches from the code. This is beneficial on wide and deep pipelines where the affect of flushes due to branch miss predictions can cause bubbles in the execution pipeline. This gives rise to a large opportunity loss of instructions that could have been executed. In essence, predication converts a control dependence branch condition into a data dependence predicate bit.

For example, a processor architecture may define a 64-entry predicate register file consisting of one bit predicates. These predicates may be written by the results of compare operations, or other means. The execution of most operations may be guarded by a controlling predicate. The guard can be specified on a third source specifier by each operation.

Referring back to FIG. 1, for hard-to-predict type of branches, the compiler optimizer may convert some codes into predicated execution code. The information about the hard-to-predict branch is then passed to the low-level intermediate code so that the compiler code generator may use the information to mark each branch instruction whether it is hard-to-predict or easy-to-predict. For example, a hint bit in the instruction may be used to classify a branch instruction as the hard-to-predict type. Of course, the hardware system of support predicated execution and handling of the hard-to-predict branches in accordance with the present invention.

The hardware system can optimize the execution of hard-to-predict branches in several ways. In one case, the branch instruction has an associated hard-to-predict branch hint bit. In situations where the hint bit is set to indicate a hard-to-predict branch, a sophisticated branch predictor, such as a unit 24 in FIG. 3 is utilized for the prediction. The previously set forth heuristics are used by the compiler for the hard-to-predict branches, and for setting the branch hint bits for each branch instruction. Since the compiler has information on which branches are hard to predict, it can optionally convert some code to be executed in a predicated manner.

A flow diagram of the above-described process is shown in FIG. 2. In FIG. 2, decision block 41 identifies a branch instruction encountered in a program (block 40) as being either an easy-to-predict or a hard-to-predict type of branch. The easy-to-predict type of branch instruction is left unmarked as shown by block 12. Hard-to-predict branches are subjected to a further decision, i.e., whether or not to employ predication. This is shown in FIG. 2 by decision block 13. If predication is not to be used, the branch is simply marked (e.g., using a hint bit) as a hard-to-predict type of branch, as shown by block 14. Conversion of the branch into predicated execution code is represented by block 15 in FIG. 2.

I claim:

1. A method of handling branches comprising the steps of:
   (a) inputting a source program having one or more branch instructions to a compiler;
   (b) compiling the source program to produce a machine-executable code therefrom, with a set of heuristics being applied to classify each of the one or more branch instructions inputting as a hard-to-predict type or a simple type of branch, the set of heuristics including identification of a conditional expression that specifies an array element access or a pointer reference;
   (c) running the machine-executable code on a processor that includes first and second branch predictor circuits.

2. The method according to claim 1 further comprising the step, before step (c), of:
   marking in the machine-executable code each of the one or more branch instructions that satisfy the set of heuristics with a bit that identifies the branch instruction as the hard-to-predict type of branch.

3. The method of claim 1 wherein step (c) comprises the step of:
   predicting a target address of the branch instruction of the hard-to-predict type of branch using the first branch predictor circuit.

4. The method according to claim 1 wherein step (c) comprises the step of:

predicting the target address of the branch instruction of the simple type of branch using the second branch predictor circuit.

5. The method according to claim 1 wherein the set of heuristics further includes a loop that traverses a linked data structure, or a loop that iterates more than a predetermined number of times.

6. The method according to claim 5 wherein the predetermined number of times is greater than 8.

7. A method of handling branch instructions comprising the steps of:

(a) compiling a source program that includes first and second branch instructions to produce an intermediate code;

(b) applying a set of heuristics to the intermediate code that classifies the first branch instruction as a hard-to-predict type, and the second branch instruction as a simple type;

(c) generating machine-executable code from the intermediate code, the machine-executable code including information which identifies the first branch instruction as the hard-to-predict type, the machine-executable code converting the first branch instruction into predicated execution code;

(d) running the machine-executable code on a processor that includes first and second branch predictors which respectively operate on the hard-to-predict and simple type branch instructions.

8. The method according to claim 7 wherein the processor includes first and second branch predictors which respectively operate on the hard-to-predict and simple type branch instructions, and the information that identifies the first branch instruction as the hard-to-predict type comprises a hint bit.

9. The method according to claim 8 wherein the first branch predictor predicts a target address of the first branch instruction responsive to the hint bit.

10. A system for handling branch instructions of a computer program comprising:

a compiler that generates a machine-executable code from a source code listing of the computer program, the compiler including an algorithm that classifies a branch instruction as a hard-to-predict type of branch instruction according to one or more heuristics, the hard-to-predict type of branch instruction having an associated hint bit that is set by the compiler, the one or more heuristics including identification of a conditional expression that specifies an array element access or a pointer reference;

a processor that executes the machine-executable code generated by the compiler, the processor including first and second branch predictor circuits that predict target addresses of the branch instructions, wherein the hint bit determines which of the first or second branch predictor circuits is utilized for a particular branch instruction of the machine-executable code.

11. The system of claim 10 wherein the one or more heuristics further includes identification of a loop that traverses a linked data structure or a loop that iterates more than a predetermined number of times.

12. The system of claim 11 wherein the predetermined number of times is greater than 8.

13. A system for handling branch instructions of a computer program comprising:

a compiler having a front-end that processes the source code listing and produces a high-level intermediate code that contains semantic information therefrom, an algorithm that operates on the high-level intermediate code to classify a branch instruction as a hard-to-predict type of branch instruction according to one or more heuristics, the one or more heuristics including identification of a conditional expression that specifies an array element access or a pointer reference, an optimizer that converts the high-level intermediate code operated upon by the algorithm into a low-level intermediate code, a portion of the hard-to-predict type of branch instructions being converted into predicate execution code, a code generator that generates a machine-executable code from the optimized low-level intermediate code, a remaining portion of the hard-to-predict branch instructions being marked with a hint bit;

a processor that executes the machine-executable code generated by the compiler, the processor including first and second branch predictors that predict a target address of the branch instructions wherein the hint bit determines which of the first or second branch predictors is utilized for a particular branch instruction of the machine-executable code.

14. The system of claim 13 wherein the one or more heuristics further includes a loop that traverses a linked data structure or a loop that iterates more than a predetermined number of times.

15. The system of claim 14 wherein the predetermined number of times is greater than 8.

\* \* \* \* \*